United States Patent

[11] 3,582,571

[72] Inventors Charles N. Sprott;
Joe A. Young, both of Lexington, Ky.
[21] Appl. No. 768,084
[22] Filed Oct. 16, 1968
[45] Patented June 1, 1971
[73] Assignee International Business Machines Corporation
Armonk, N.Y.

[54] MULTI-GAP MAGNETIC HEAD HAVING GAPS DISPOSED AT AN ANGLE TO EACH OTHER
7 Claims, 4 Drawing Figs.

[52] U.S. Cl. .......... 179/100.2
[51] Int. Cl. .......... G11b 5/26
[50] Field of Search .......... 179/100.2 C, 100.2 D; 340/174.1 F; 346/74 MC

[56] References Cited
UNITED STATES PATENTS

| | | | |
|---|---|---|---|
| 2,633,504 | 3/1953 | Beer | 179/100.2 |
| 2,653,189 | 9/1953 | Camras | 179/100.2 |
| 2,736,776 | 2/1956 | Camras | 179/100.2 |
| 2,803,708 | 8/1957 | Camras | 179/100.2 |

*Primary Examiner*—Stanley M. Urynowicz, Jr.
*Assistant Examiner*—Robert S. Tupper
*Attorneys*—Hanifin and Clark and Frank C. Leach, Jr.

ABSTRACT: A single magnetic head has the longitudinal axes of a record-playback gap and an erase gap disposed at an angle to each other to reduce erase gap pickup interference during playback. The angle is preferably 45°.

INVENTORS
CHARLES N. SPROTT
JOE A. YOUNG

BY Frank C. Leach Jr.
ATTORNEY

MULTI-GAP MAGNETIC HEAD HAVING GAPS DISPOSED AT AN ANGLE TO EACH OTHER

In a single magnetic head utilized for recording signals on a magnetic recording medium, reproducing the recorded signals on the magnetic recording medium for playback, and erasing the recorded signals on the magnetic recording medium, the head has a first gap for both recording and playback and a second gap for erasing the recorded signals on the magnetic recording medium. When this type of magnetic head is utilized in dictating equipment, it is necessary that the record-playback gap and the erase gap be disposed as close to each other as possible. This is to enable recording of material to begin on the magnetic recording medium immediately after any material on the magnetic recording medium has been listened to by the dictator through means of the playback gap.

This required closeness between the erase gap and the record-playback gap results in a single center pole piece being utilized as one of the pole pieces for both the erase gap and the record-playback gap. Since a hum created by the AC power supply requires a portion of the playback winding to be mounted on the center pole piece in addition to a portion being disposed on the outer pole piece, which forms the other pole piece of the record-playback gap, any magnetic flux introduced into the erase gap by the recorded material on the magnetic recording medium passing over the erase gap will be received by that portion of the playback winding on the center pole piece and be reproduced in the playback circuit.

Thus, when utilizing an erase gap adjacent the record-playback gap in a single magnetic head in the normal arrangement of the longitudinal axes of the gaps being parallel to each other and perpendicular to the direction of movement of the magnetic recording medium, the signals on the magnetic recording medium, which first passes the erase gap before passing the record-playback gap in order that all signals on the magnetic recording medium may be erased before recording occurs when the dictating equipment is in the recording mode, will be introduced into the playback circuit for reproduction prior to the signal being introduced into the signal playback circuit through the record-playback gap. Thus, a preecho signal will be produced in the playback mode to affect sound quality.

The erase gap must have substantial width to insure substantial penetration of the magnetic erase field into the iron oxide on the recording medium. As the width of the erase gap increases, the penetration of the magnetic erase field into the iron oxide increases. To obtain the desired penetration, the width of the erase gap must be much greater than the wave lengths of the high frequency signals.

The record-playback gap must be sufficiently small to detect the highest frequency signals, which are actually variations in the magnetic flux density arranged across the magnetic recording medium, that are recorded and desired to be reproduced when the dictating equipment is in the playback mode. Since these higher frequency signals have a relatively small wave length, it is necessary to design the record-playback gap so that its width is smaller than the wave length of the highest frequency that it is desired to receive in the signal reproducing means when the dictating equipment is in the playback mode. Thus, the width of the erase gap is much larger than the width of the record-playback gap.

Since the erase gap is substantially wider than the record-playback gap, the preecho problem primarily exists due to signals of low frequency. This is because the wave lengths of low frequency signals are greater than the wave lengths of high frequency signals whereby only a single low frequency signal or a portion thereof will be disposed between the pole pieces of the erase gap at any instance. When this occurs, the portion of the playback winding on the center pole piece receives a signal of sufficient amplitude to produce the preecho signal in the reproducing means when the dictating equipment is in the playback mode.

When the signals received at the erase gap are of a relatively high frequency, the wave length of the signal is such that it does not extend across the width of the erase gap. As a result, more than one recorded wave length may be across the erase gap at the same time so that no intelligible signal may be received by the reproducing means when the dictating equipment device is in the playback mode and only high frequency signals are being received at the erase gap.

The present invention satisfactorily solves the foregoing problem by disposing the longitudinal axis of the erase gap at an angle, which is preferably 45°, to the longitudinal axis of the record-playback gap. In this arrangement, because the erase gap is disposed at a nonparallel angle with the record-playback gap, the erase gap also is disposed at this same angle with respect to the signal recorded on the magnetic recording medium. Thus, at each instance in the playback process, the erase gap is subjected simultaneously to many different signals which were recorded not at the same time but over a period of time corresponding to the magnitude of the angle between the erase and record-playback gaps. In general, these different signals to which the erase gap is subjected are not in phase with each other. Thus, the result is that the effect of these combined signals on the playback winding on the center pole piece is very much smaller than the effect of the in-phase signals from the record-playback gap.

While the problem of the preecho occurring in the signal reproducing means has been indicated as existing due to the center pole piece having a portion of the playback winding thereon, it should be understood that the problem would exist to a lesser extent even if there is no playback winding on the center pole piece. This is because some of the flux, which is created in the erase gap by signals on the magnetic recording medium, would flow from the outer pole piece, which forms one pole of the erase gap, to the outer pole piece, which forms one pole of the record-playback winding. It would be necessary for the entire playback winding to be on the outer pole piece if one portion of the winding were not on the center pole piece. Therefore, the problem would still exist even if the center pole piece did not have a portion of the playback winding thereon.

An object of this invention is to provide a unique gap construction for a multigap magnetic head.

Another object of this invention is to provide a multigap magnetic head having improved sound quality when the dictating equipment which uses the magnetic head is in its playback mode.

The foregoing and other objects, features, and advantages of the invention will be more apparent from the following more particular description of the preferred embodiment of the invention as illustrated in the accompanying drawing.

Figure 1:
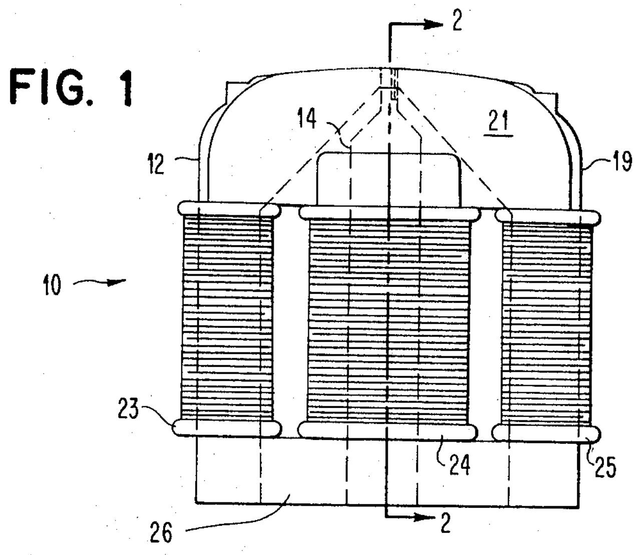
FIG. 1 is an elevational view of a magnetic head utilizing the gap arrangement of the present invention.
Figure 2:
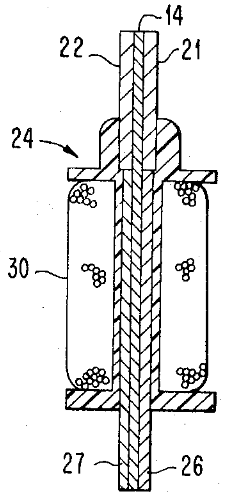
FIG. 2 is a sectional view of the head of FIG. 1 and taken along line 2—2 of FIG. 1.

Referring to the drawing and particularly FIG. 1, there is shown a magnetic head 10. The magnetic head 10 may be utilized in dictating equipment of the type shown and described in the copending patent application of Chester M. Fackler et al. for "Dictating And Transcribing Apparatus With Automatic And Semiautomatic Operator-Controlled Facilities," Ser. No. 699,259, filed Jan. 19, 1968, and assigned to the same assignee as the assignee of the present application.

Figure 4:
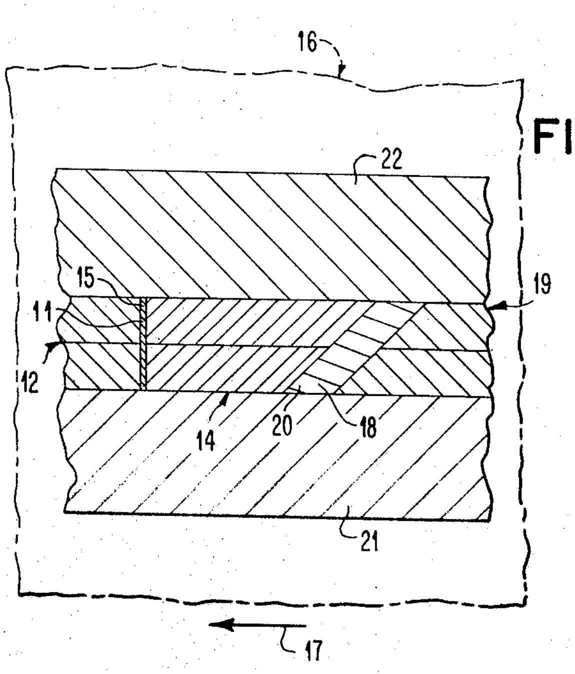
FIG. 4 is a sectional view showing the arrangement of the gaps in the magnetic head of FIG. 1.

The magnetic head 10 includes a record-playback gap 11 (see FIG. 4), which is formed between an outer pole piece 12 and a center pole piece 14 by a shim 15 being disposed between adjacent surfaces of the pole pieces 12 and 14. The pole pieces 12 and 14 are formed of a suitable magnetic material of high permeability while the shim 15 is formed of a nonmagnetic material having substantially the same very low permeability as air. One suitable example of the material of the shim 15 is beryllium copper.

The adjacent surfaces of the pole pieces 12 and 14 are disposed substantially parallel to each other to form the record-playback gap 11 with its longitudinal axis substantially perpendicular to the direction of movement of a magnetic recording medium 16, which may be a belt or a tape, for example. The direction of movement of the magnetic recording medium 16 is indicated by arrow 17 in FIG. 4.

The magnetic head 10 has an erase gap 18, which is formed between the center pole piece 14 and an outer pole piece 19 by a shim 20 disposed between the adjacent surfaces of the pole pieces 14 and 19. The shim 20 is formed of a suitable nonmagnetic material having a very low permeability that is substantially the same as air. One suitable example of the material of the shim 20 is beryllium copper. The outer pole piece 19 is formed of the same magnetic material of high permeability as the pole pieces 12 and 14.

The adjacent surfaces of the center pole piece 14 and the outer pole piece 19 between which the shim 20 is disposed are formed at an angle to the adjacent surfaces of the outer pole piece 12 and the center pole piece 14 and at an angle to the direction of movement of the magnetic recording medium 16. Thus, when the magnetic recording medium 16 moves in the direction of the arrow 17, the magnetic flux density which was recorded on the magnetic recording medium 16 by the record-playback gap 11 will be uncorrelated when detected by the erase gap 18. Thus, substantially no net signal is picked up by the erase gap 18 when the dictating equipment, which has the magnetic head 10, is operated in the playback mode.

The longitudinal axis of the erase gap 18, which is formed by the shim 20, is preferably disposed at an angle of 45° to both the longitudinal axis of the record-playback gap 11, which is formed by the shim 15, and to the direction of movement of the magnetic recording medium 16 as indicated by the arrow 17.

The outer pole pieces 12 and 19 are secured to each other by a wear plate 21, which is preferably formed of brass. The wear plate 21 is bonded to both the pole pieces 12 and 19 by suitable means such as an epoxy, for example. Each of the pole pieces 12 and 19 is formed of two laminations that are bonded to each other by suitable means such as an epoxy, for example.

The center pole piece 14 has a wear plate 22, which is preferably formed of brass, secured on the opposite side thereof from the wear plate 21. The wear plate 22 is bonded to the center pole piece 14 by suitable means such as an epoxy, for example. The center pole piece 14 is formed of two laminations in the same manner as are the outer pole pieces 12 and 19.

The magnetic head 10 includes three bobbins 23—25, which are formed of a nonmagnetic material having substantially the same very low permeability as air such as plastic, for example, within which the pole pieces 12, 14, and 19 are disposed. The outer pole piece 12 is disposed within the bobbin 23, the center pole piece 14 is disposed within the bobbin 24, and the outer pole piece 19 is disposed within the bobbin 25. Each of the bobbins 23—25 also has one leg of each of a pair of E-shaped pole pieces 26 and 27 disposed therein. One of the outer legs of the E-shaped pole piece 26 is disposed on one side of the outer pole piece 12 in the bobbin 23 and in contact therewith while one of the outer legs of the E-shaped pole piece 27 is disposed on the opposite side of the outer pole piece 12 in the bobbin 23 and in contact therewith. The size of the passage within the bobbin 23 is such that there is a tight fit between the pole pieces therein.

The center leg of the E-shaped pole piece 26 is disposed within the bobbin 24 on one side of the center pole piece 14 and in contact therewith while the center leg of the E-shaped pole piece 27 is disposed within the bobbin 24 on the opposite side of the center pole piece 14 from the leg of the E-shaped pole piece 26 and in contact therewith.

The other outer leg of the E-shaped pole piece 26 is disposed within the bobbin 25 on one side of the outer pole piece 19 and in contact therewith while the other outer leg of the E-shaped pole piece 27 is disposed within the bobbin 25 on the opposite side of the outer pole piece 19 and in contact therewith. The formation of the magnetic head 10 with the particular arrangement of the pole pieces and the bobbins may be made in any suitable manner.

Figure 3:
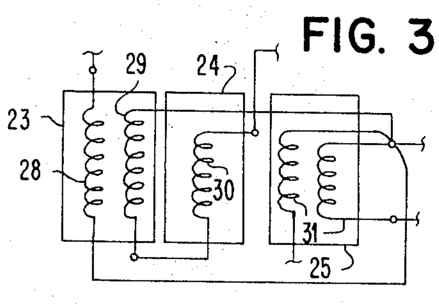
FIG. 3 is a schematic elevational view illustrating the arrangement of the windings for the magnetic head of FIG. 1.

As shown in FIG. 3, the bobbin 23 has a winding 28 wrapped therearound. The winding 28 functions as the record winding and is energized as described in the aforesaid Fackler et al. application when it is desired to record information on the magnetic recording medium 16. The bobbin 23 has a second winding 29 thereon cooperating with a winding 30 on the bobbin 24 to form the playback windings. The playback windings 29 and 30 are disposed on the bobbins 23 and 24 rather than on the same bobbin to control a hum problem, which is created by the AC power source. The windings 29 and 30 are energized, in a manner described in the aforesaid Fackler et al. application, whenever it is desired to operate the dictating equipment of the aforesaid Fackler et al. application in the playback mode. This permits reproduction of the signals on the magnetic recording medium 16 for listening purposes.

The bobbin 25 has a winding 31 thereon. The winding 31 functions as the erase winding and is utilized when the dictating equipment of the aforesaid Fackler et al. application is in the recording mode. At this time, the winding 28 also is energized.

Due to the width of the erase gap 18, the winding 31 produces sufficient magnetic flux to penetrate the iron oxide on the magnetic recording medium 16 prior to the magnetic recording medium 16 passing over the record-playback gap 11 for recording purposes. This removes any prior recorded signals on the magnetic recording medium 16 before recording occurs.

When the dictating equipment of the aforesaid Fackler et al. application is in the playback mode, the magnetic recording medium 16 still moves in the same direction as when the dictating equipment is in the recording mode; this is indicated by the arrow 17. Thus, the recording medium 16 passes across the erase gap 18 prior to passing across the record-playback gap 11.

While only the playback windings 29 and 30 are energized at this time, a magnetic flux is produced across the erase gap 18 due to the center pole piece 14 having the winding 30 thereon. This produces the magnetic flux through the erase gap 18 during playback so that signals on the recording medium 16 passing across the erase gap 18 produce a preecho signal that is received at the reproducing means before the signal is received from the record-playback gap 11 when the longitudinal axes of the gaps 11 and 18 are parallel. However, by positioning the erase gap 18 at an angle with respect to the longitudinal axis of the record-playback gap 11, portions of many different signals on the recording medium 16 are received within the erase gap 18 at any instance. Since these signals on the magnetic recording medium 16 are produced by variations in magnetic flux density perpendicular to the longitudinal axis of the record-playback gap 11, these variations of magnetic flux density tend to cancel out each other so that substantially no signal is received by the reproducing means of the dictating equipment of the aforesaid Fackler et al. application.

While the longitudinal axis of the erase gap 18 has been shown as disposed at an angle of 45° to the longitudinal axis of the record-playback gap 11, it should be understood that the longitudinal axis could be disposed at other nonparallel angles with respect to the longitudinal axis of the record-playback gap 11. It is only necessary that the angle be such that no signal of sufficient amplitude to cause a preecho in the reproducing means can be produced when the recording medium 16 passes over the erase gap 18.

While the longitudinal axis of the record-playback gap 11 has been shown as disposed substantially perpendicular to the direction of movement of the magnetic recording medium 16 as indicated by the arrow 17, it should be understood that such is not a requisite to satisfactory operation of the present invention. Thus, the record-playback gap 11 could have its longitudinal axis at an angle to the direction of movement of the magnetic recording medium 16. It is only necessary that the longitudinal axes of the record-playback gap 11 and the erase gap 18 be at different angles to the direction of motion of the magnetic recording medium. Furthermore, if desired, the erase gap 18 could be disposed substantially perpendicular to the direction of movement of the recording medium 16 with the longitudinal axis of the record-playback gap 11 disposed at an angle with respect to the longitudinal axis of the erase gap 18 so that the desired elimination of the interference with the playback signal by the erase gap 18 could be obtained.

Even if the distance between the erase gap 18 and the record-playback gap 11 should be so small that a discernible preecho is not observed by the operator of the dictating machine when the longitudinal axes of the record-playback gap and the erase gap are parallel to each other, there would still be a degradation of sound quality. This would usually be apparent in a form of distortion of the output of the reproducing means.

An advantage of this invention is that it permits utilization of both a record-playback gap and an erase gap in a single magnetic head without any interference of the playback signal by the erase gap. Another advantage of this invention is that it permits utilization of a multigap magnetic head for a dictating apparatus without any degradation of sound quality.

While the invention has been particularly shown and described with reference to a preferred embodiment thereof, it will be understood by those skilled in the art that various changes in form and details may be made therein without departing from the spirit and scope of the invention.

What I claim is:

1. A single magnetic head having:

a first gap for both recording signals on a magnetic recording medium passing said first gap and reproducing signals recorded on the magnetic recording medium for playback;

first and second pole pieces cooperating to form said first gap;

a second gap for erasing recorded signals from a magnetic recording medium passing said second gap;

said second pole piece and a third pole piece cooperating to form said second gap;

a record winding;

a playback winding;

an erase winding;

said first pole piece having said record winding thereon;

each of said first and second pole pieces having a portion of said playback winding thereon;

said third pole piece having said erase winding thereon;

and means to prevent intelligible signals from being picked up from the recording medium through said second gap during playback by disposing said first and second gaps with their longitudinal axes at an angle of at least 5° to each other.

2. The magnetic head according to claim 1 in which:

said second gap has a width substantially greater than the width of said first gap;

and said first gap has a width smaller than the wave length of the highest frequency signal that it is desired to receive.

3. The magnetic head according to claim 1 in which one of said first and second gaps has its longitudinal axis disposed substantially perpendicular to the direction of movement of the magnetic recording medium.

4. The magnetic head according to claim 3 in which the other of said first and second gaps has its longitudinal axis at an angle of 45° to the longitudinal axis of said one gap.

5. The magnetic head according to claim 1 in which said first gap has its longitudinal axis disposed substantially perpendicular to the direction of movement of the magnetic medium.

6. The magnetic head according to claim 5 in which said second gap has its longitudinal axis at an angle of 45° to the longitudinal axis of said first gap.

7. The magnetic head according to claim 6 in which:

said second gap has a width substantially greater than the width of said first gap;

and said first gap has a width smaller than the wave length of the highest frequency signal that it is desired to receive.